(12) United States Patent
Nishikawa

(10) Patent No.: US 9,614,407 B2
(45) Date of Patent: Apr. 4, 2017

(54) ROTARY ELECTRIC MACHINE STATOR

(71) Applicant: Mitsubishi Electric Corporation, Tokyo (JP)

(72) Inventor: Ken Nishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 14/656,909

(22) Filed: Mar. 13, 2015

(65) Prior Publication Data
US 2016/0118853 A1    Apr. 28, 2016

(30) Foreign Application Priority Data

Oct. 23, 2014  (JP) ................................ 2014-216529

(51) Int. Cl.
*H02K 3/38* (2006.01)
*H02K 3/28* (2006.01)
*H02K 3/52* (2006.01)

(52) U.S. Cl.
CPC ......... *H02K 3/522* (2013.01); *H02K 2203/09* (2013.01)

(58) Field of Classification Search
CPC ...... H02K 3/50; H02K 3/522; H02K 15/0056; H02K 15/0062; H02K 15/04; H02K 15/10; H02K 3/38; H02K 3/28; H02K 15/02
See application file for complete search history.

(56) References Cited

U.S. PATENT DOCUMENTS

| | | | | |
|---|---|---|---|---|
| 6,930,418 B2* | 8/2005 | Kobayashi | ............. | H02K 3/522 310/214 |
| 6,993,829 B2* | 2/2006 | Kobayashi | ......... | H02K 15/0056 29/596 |
| 7,626,294 B2* | 12/2009 | Ohta | ..................... | H02K 1/148 310/194 |
| 7,650,682 B2* | 1/2010 | Sugishima | ............. | H02K 1/148 242/361.1 |
| 2003/0094879 A1* | 5/2003 | Kobayashi | ............. | H02K 3/522 310/238 |
| 2003/0173841 A1* | 9/2003 | Kobayashi | ......... | H02K 15/0056 310/71 |
| 2006/0119207 A1* | 6/2006 | Okada | .................... | H02K 3/522 310/194 |
| 2012/0098363 A1* | 4/2012 | Elser | ..................... | H02K 3/522 310/71 |

FOREIGN PATENT DOCUMENTS

| | | |
|---|---|---|
| JP | 61-205252 U | 12/1986 |
| JP | 2003-134753 A | 5/2003 |

(Continued)

OTHER PUBLICATIONS

Communication dated Jul. 14, 2015 from the Japanese Patent Office in counterpart application No. 2014-216529.

*Primary Examiner* — Tran Nguyen
(74) *Attorney, Agent, or Firm* — Sughrue Mion, PLLC; Richard C. Turner

(57) ABSTRACT

A rotary electric machine stator includes an electric power distributing apparatus that includes: respective phase busbars that are electrically connected to respective phase coils; a resin holder that is disposed so as to surround the respective phase busbars, and that includes a partitioning wall portion that insulates between adjacent busbars, the resin holder including an opening portion that opens outward in an axial direction of the stator core; and a resin cover that covers the opening portion. A rib that is bent radially is formed on a radially outer edge portion of the opening portion of the resin holder.

5 Claims, 4 Drawing Sheets

(56) References Cited

FOREIGN PATENT DOCUMENTS

| | | |
|---|---|---|
| JP | 2007-314060 A | 12/2007 |
| JP | 2009-247061 A | 10/2009 |
| JP | 2010-148175 A | 7/2010 |
| JP | 2014-197951 A | 10/2014 |

* cited by examiner

F I G. 2
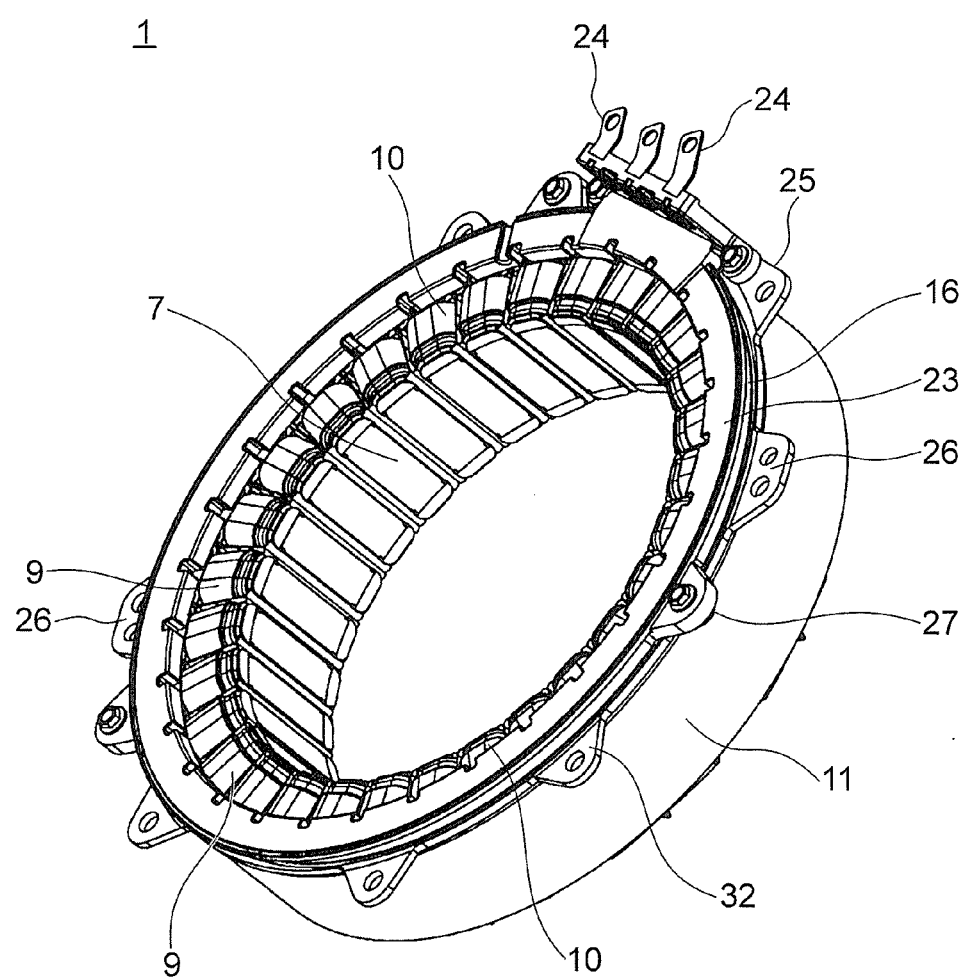

ROTARY ELECTRIC MACHINE STATOR

BACKGROUND OF THE INVENTION

1. Field of the Invention

The present invention relates to a rotary electric machine stator that includes: a stator core that surrounds an outer circumference of a rotor; respective phase coils that are mounted to the stator core; and an electric power distributing apparatus that is disposed around an entire circumference of one end surface of the stator core, and that is electrically connected to the coils.

2. Description of the Related Art

In hybrid vehicles to which an engine and a motor are mounted, thin flat brushless motors that are sandwiched between the engine and a transmission are often adopted.

In such cases, it is preferable for a stator of the motor to have a large diameter and a short axial length to allow for mountability to existing vehicles, and because of that, concentrated windings that enable shortening of coil ends are often adopted.

When concentrated windings are adopted, an electric power distributing apparatus is required that has: respective phase busbars for electric power distribution for performing electrical connection among respective phase coils that are mounted to the stator core, and a resin holder that houses the respective phase busbars.

However, in the case of the above-mentioned thin flat brushless motors, since the outside diameter of the stator is large, the outside diameter of the electric power distributing apparatus, which is disposed in a ring shape on one end surface of the stator, is also large, and because joint portions between the respective phase coils and the respective phase busbars are also disposed on a radially outer side, vibrational displacement of the joint portions when vibration is applied is increased, which may result in problems such as breakage of the joint portions, etc.

As a means of solving that problem, rotary electric machines are known in which vibration of an entire electric power distributing apparatus is suppressed by interposing a resin between the electric power distributing apparatus and a stator core to increase vibrational durability of joint portions between respective phase coils and respective phase busbars (see Patent Literature 1, for example).

CITATION LIST

Patent Literature

[Patent Literature 1]
Japanese Patent Laid-Open No. 2010-148175 (Gazette)

SUMMARY OF THE INVENTION

However, in the case of that rotary electric machine, one problem has been that large amounts of resin must be used.

The portions that are filled with the resin are recess portions into which projections that are formed on a core back portion of the core are inserted, and are formed on surfaces of supporting portions of a connecting ring that face the core. Thus, another problem has been that the resin must fill predetermined positions, adding another complicated process.

In addition, reductions in adhesive force of the resin may become more pronounced due to thermal cycling, or due to coolants such as insulating oil, etc., and another problem has been that vibration resistance of the electric power distributing apparatus deteriorates significantly in such cases.

The present invention aims to solve the above problems and an object of the present invention is to provide a rotary electric machine stator that can improve durability of joint portions between respective phase coils and respective phase busbars by increasing overall rigidity of an electric power distributing apparatus without adding resin.

In order to achieve the above object, according to one aspect of the present invention, there is provided a rotary electric machine stator including: a stator core that surrounds an outer circumference of a rotor; respective phase coils that are mounted to the stator core; and an electric power distributing apparatus that is disposed around an entire circumference of one end surface of the stator core, and that is electrically connected to the coils, wherein: the electric power distributing apparatus includes: respective phase busbars that are electrically connected to the respective phase coils; a resin holder that is disposed so as to surround the respective phase busbars, and that includes a partitioning wall portion that insulates between adjacent busbars, the resin holder including an opening portion that opens outward in an axial direction of the stator core; and a resin cover that covers the opening portion; and a rib that is bent radially is formed on a radially outer edge portion of the opening portion of the resin holder.

According to the rotary electric machine stator according to the present invention, because the rib that is bent radially is formed on the radially outer edge portion of the opening portion of the resin holder, overall rigidity of the electric power distributing apparatus can be increased without adding resin, enabling durability of joint portions between the respective phase coils and the respective phase busbars to be improved.

BRIEF DESCRIPTION OF THE DRAWINGS

FIG. 2 is an oblique projection that shows the stator from FIG. 1;

DETAILED DESCRIPTION OF THE PREFERRED EMBODIMENTS

Embodiment 1

Figure 1:
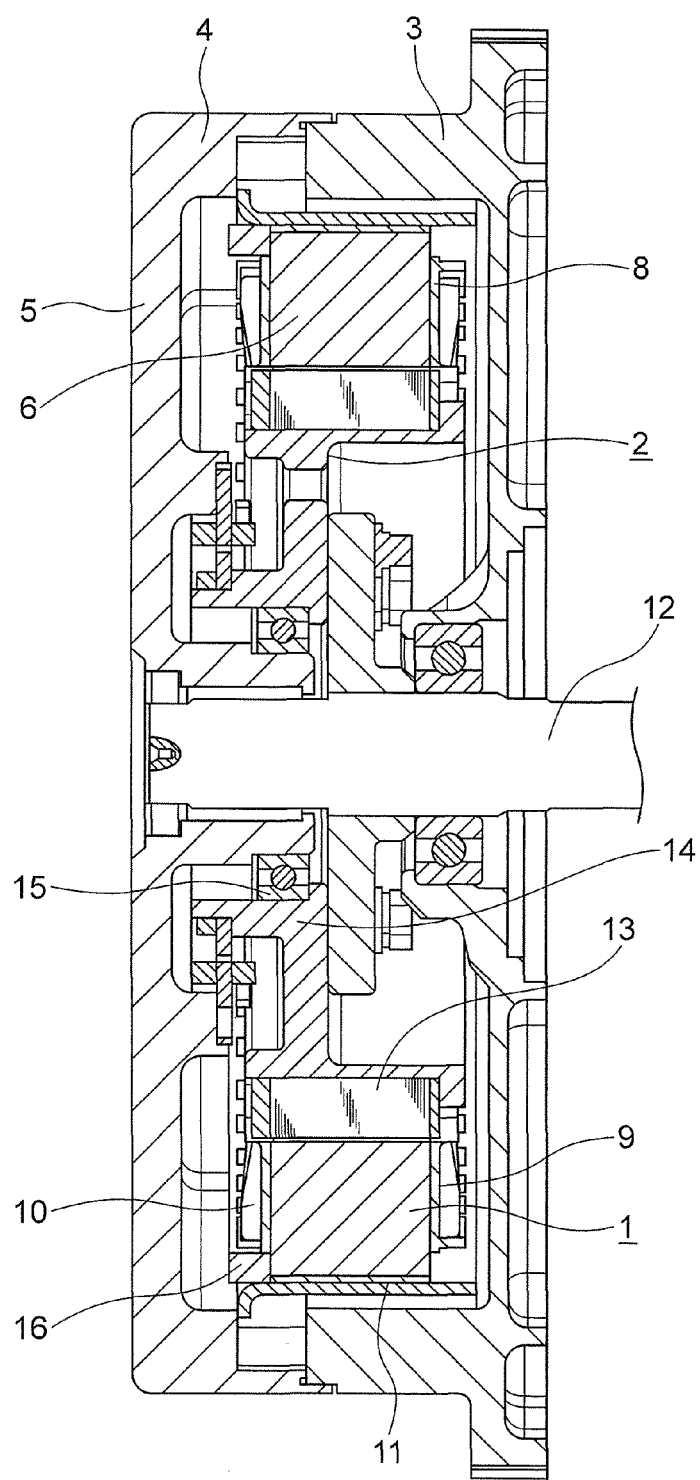
FIG. 1 is a cross section that shows a motor that incorporates a stator according to Embodiment 1 of the present invention.

FIG. 1 is a cross section that shows a motor that incorporates a stator 1 according to Embodiment 1 of the present invention, and FIG. 2 is an oblique projection that shows the stator 1 from FIG. 1.

Moreover, in the stator 1 in FIG. 2, a frame 11 and an electric power distributing apparatus 16 are depicted so as to be offset in a circumferential direction.

This motor, which is a rotary electric machine, is a thin flat brushless motor that is mounted to a hybrid vehicle.

The motor includes: a stator 1; and a rotor 2 which is disposed inside the stator 1, and these are housed in a housing 5 that is constituted by a base 3 and a cover 4.

The stator 1 includes a stator core 6 that is configured such that a plurality of core segments 7 that are constituted by laminated steel plates are press-fitted into a ring-shaped frame 11.

A three-phase alternating-current winding in which respective phase coils 9 are wye-connected is mounted to the stator core 6.

The plurality of core segments 7 are in close contact in a circumferential direction, and slots are formed between adjacent core segments 7.

The respective phase coils 9, i.e., a U phase, a V phase, and a W phase, are mounted onto each of the core segments 7 by means of bobbins 8. The respective phase coils 9, which are constituted by concentrated windings of electric wire, are disposed so as to repeat sequentially in order of a U phase, a V phase, and a W phase in the circumferential direction. The respective phase coils 9 have coil ends 10 that protrude axially outward from two axial end surfaces of the core segments 7.

An electric power distributing apparatus 16 that supplies electric power to the respective phase coils 9 is disposed on an outer circumferential side of an end surface of the stator core 6 near the cover 4.

The rotor 2 includes: a shaft 12; a rotor core 13 that is constituted by laminated steel plates, the rotor core 13 being fixed by means of a boss portion 14 into which the shaft 12 is press-fitted; and permanent magnets (not shown) that are embedded in the rotor core 13. A bearing 15 is press-fitted between the cover 4 of the housing 5 and the boss portion 14, and a rotor 2 that has a predetermined clearance from the stator core 6 rotates together with the shaft 12.

Figure 3:
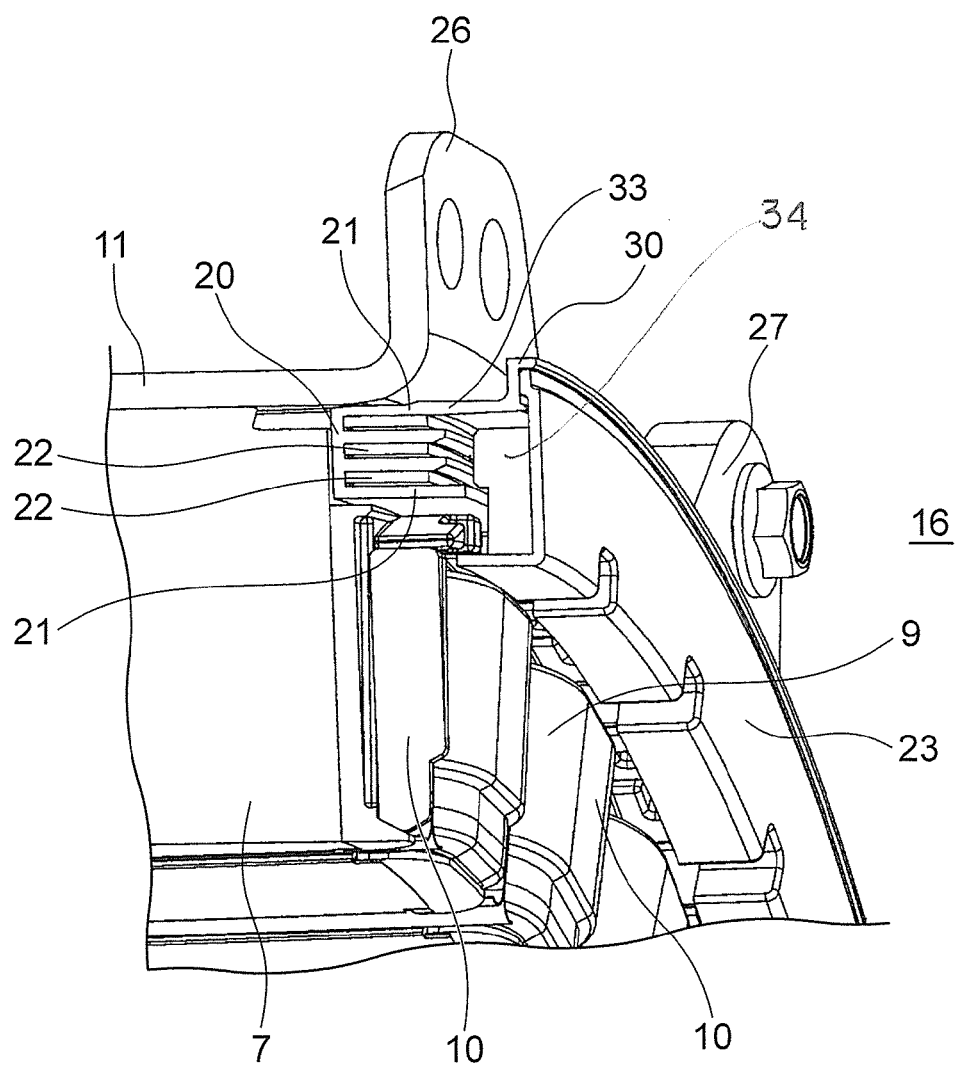
FIG. 3 is a cutaway oblique projection that shows an electric power distributing apparatus from FIG. 2.
Figure 4:
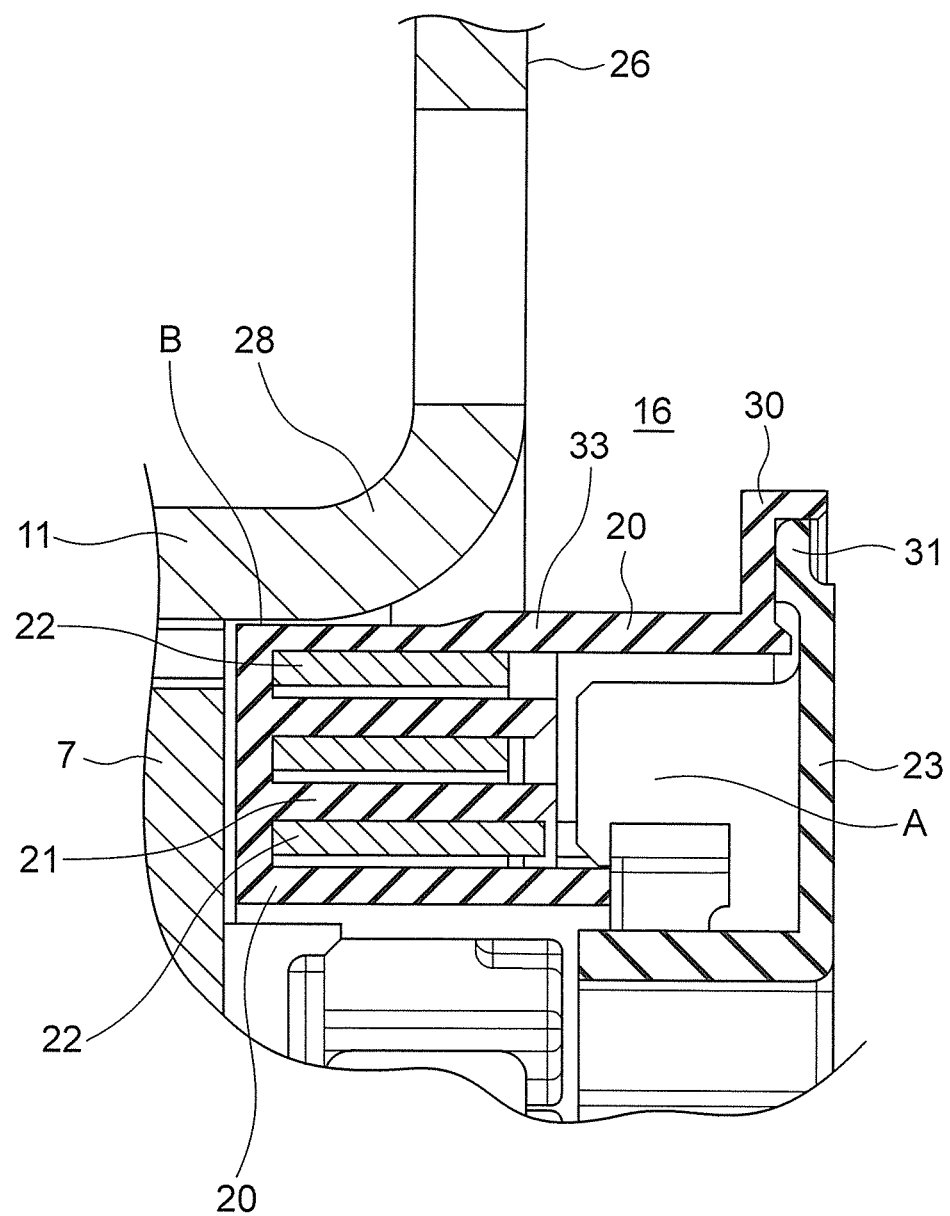
FIG. 4 is a partial cross section of FIG. 3.

FIG. 3 is a cutaway oblique projection that shows the electric power distributing apparatus 16 from FIG. 2, and FIG. 4 is a partial cross section of FIG. 3.

The electric power distributing apparatus 16 includes: respective phase busbars 22 to which terminal wires of the respective phases coils 9 that extend axially outward from each of the core segments 7 are connected; a resin holder 20 that has: partitioning wall portions 21 that insulate between the respective phase busbars 22; and an opening portion A that opens axially outward from the stator core 6; a resin cover 23 that covers the opening portion A; and a plurality of partitioning portions 34 that are respectively disposed on intermediate portions of respective joint portions that join together the terminal wires of the respective phases coils 9 and the respective phase busbars 22 to isolate adjacent joint portions electrically. Each of the partitioning portions 34 extends in a radial direction from an inner circumferential side of the resin cover 23 to an outer circumferential side.

A terminal block 25 that has respective phase electric power supplying terminal portions 24 is disposed on a circumferential edge portion of the resin holder 20. The respective phase electric power supplying terminal portions 24 are connected to the respective phase busbars 22 inside the terminal block 25.

Among the respective partitioning wall portions 21, a radially outermost partitioning wall portion 33 protrudes in an axial direction of the stator 1 around its entire circumference. A rib 30 that is bent radially outward at ninety degrees is disposed on a tip end portion of the radially outermost partitioning wall portion 33. A groove portion 31 that is formed so as to be bent into an L shape is formed on a tip end portion of the rib 30, which is formed around the entire circumference.

A circumferential edge portion of the resin cover 23 is fitted into the groove portion 31.

The resin holder 20 is fixed to the frame 11 by fastening holder flanges 27 to mounting flanges 26 of the frame 11 using screws.

The standing mounting flanges 26 have a curved surface portion 28 at a root portion, and face the rib 30.

A gap B is formed around the entire circumference between an inner circumferential surface of the frame 11 and the radially outermost partitioning wall portion 33 of the resin holder 20.

Moreover, a pair of the mounting flanges 26 are disposed so as to face each other, and two apertures are formed on each, a first aperture of the two being an aperture that is used for fixing to the holder flanges 27, and a second aperture being an aperture that serves in the positioning of the stator 1 relative to the housing 5 in cooperation with pins that are mounted to the cover 4 when mounting the stator 1 to the housing 5.

Moreover, stator flanges 32 that are adjacent to the mounting flanges 26 serve to fix the stator 1 to the cover 4.

In a motor that incorporates the stator 1 according to Embodiment 1 above, electric current flows to the respective phases coils 9 by supplying external power to the respective phase busbars 22 through the electric power supplying terminal portions 24 of the terminal block 25.

As a result thereof, a rotating magnetic field is generated in the stator core 6 such that the rotor 2 is attracted to the rotating magnetic field and rotates, and the shaft 12, which is integrated with the rotor 2, also rotates, the torque therefrom being transmitted externally.

According to a stator 1 according to Embodiment 1, because a rib 30 that is bent radially outward is formed on a radially outer edge portion of an opening portion A of a resin holder 20 that is formed outside respective phase busbars 22 in an axial direction of a stator core 6, rigidity of the resin holder 20 can be improved, enabling displacement due to the respective phase busbars 22 themselves being subject to vibration to be suppressed, thereby enabling breakage at joint portions between the respective phases coils 9 and the respective phase busbars 22 to be prevented.

Because the rib 30 bends radially outward, and has a groove portion 31 on a tip end portion, and a circumferential edge portion of the resin cover 23 fits into the groove portion 31 of the resin holder 20, the positions of the partitioning portions 34 that are integrated with the resin cover 23 are stabilized, enabling optimal creepage distance between the respective phases coils 9 and the respective phase busbars 22 to be maintained for a long time.

Because a cylindrical frame 11 into which a plurality of core segments 7 are press-fitted has standing mounting flanges 26, and the rib 30 faces the mounting flanges 26, a space that is sandwiched between the two constitutes a passage through which air that constitutes a coolant passes, and the air flows smoothly over the rib 30, improving cooling performance of the respective phases coils 9 and the respective phase busbars 22.

Because a gap B is formed between an inner circumferential surface of the frame 11 and an outer circumferential surface of the resin holder 20, cooling performance of the respective phases coils 9 and the respective phase busbars 22 is improved.

Curved surface portions 28 are formed on root portions of the standing mounting flanges 26 of the frame 11, enabling air to flow through the gap B smoothly.

Moreover, in the above embodiment, a stator 1 that is incorporated into a thin flat brushless motor that is mounted to a hybrid vehicle has been explained, but of course this is only one example, and the present invention can also be applied to stators for generators, or to stators for generator-motors.

The stator core 6 is configured by press-fitting a plurality of core segments 7 into the frame 11, but may be an integrated stator core that does not use a frame 11.

The rib 30 is bent radially outward, but the rigidity of the resin holder can be improved even if the rib 30 is bent radially inward.

What is claimed is:

1. A rotary electric machine stator comprising: a stator core that surrounds an outer circumference of a rotor; respective phase coils that are mounted to said stator core; and an electric power distributing apparatus that is disposed around an entire circumference of one end surface of said stator core, and that is electrically connected to said coils, wherein: said electric power distributing apparatus comprises: respective phase busbars that are electrically connected to said respective phase coils; a resin holder that is disposed so as to surround said respective phase busbars, and that includes a partitioning wall portion that insulates between adjacent busbars, said resin holder including an opening portion that opens outward in an axial direction of said stator core; and a resin cover that covers said opening portion; and a rib that is bent radially is formed on a radially outer edge portion of said opening portion of said resin holder, wherein:
said rib bends radially outward, and includes a groove portion on a tip end portion; and
a circumferential edge portion of said resin cover fits into said groove portion, and
wherein:
said stator core is configured such that a plurality of core segments are in close contact in a circumferential direction;
a cylindrical frame that houses said plurality of core segments includes a standing mounting flange that is fixed to a holder flange of said resin holder; and
said mounting flange faces said rib.

2. A rotary electric machine stator comprising:
a stator core that surrounds an outer circumference of a rotor;
respective phase coils that are mounted to said stator core; and
an electric power distributing apparatus that is disposed around an entire circumference of one end surface of said stator core, and that is electrically connected to said coils,
wherein:
said electric power distributing apparatus comprises:
respective phase busbars that are electrically connected to said respective phase coils;
a resin holder that is disposed so as to surround said respective phase busbars, and that includes a partitioning wall portion that insulates between adjacent busbars, said resin holder including an opening portion that opens outward in an axial direction of said stator core; and
a resin cover that covers said opening portion; and a rib that is bent radially is formed on a radially outer edge portion of said opening portion of said resin holder,
wherein:
said stator core is configured such that a plurality of core segments are in close contact in a circumferential direction; and
a gap is formed between an inner circumferential surface of a cylindrical frame that houses said plurality of core segments and an outer circumferential surface of said resin holder.

3. The rotary electric machine stator according to claim 1, wherein a gap is formed between an inner circumferential surface of said cylindrical frame and an outer circumferential surface of said resin holder.

4. The rotary electric machine stator according to claim 3, wherein a curved surface portion that expands outward in said axial direction of said stator core is formed on a side of said mounting flange near said gap.

5. The rotary electric machine stator according to claim 1, wherein said rotary electric machine stator is incorporated into a thin flat brushless motor.

* * * * *